(12) United States Patent
Arakawa et al.

(10) Patent No.: US 6,228,796 B1
(45) Date of Patent: May 8, 2001

(54) ORGANIC-INORGANIC HYBRID MATERIALS AND PROCESSES FOR PREPARING THE SAME

(75) Inventors: Motoomi Arakawa, Osaka; Kazuaki Sukata, Yawata; Yasuyuki Agari, Osaka; Masayuki Shimada, Sakai, all of (JP)

(73) Assignee: Orient Chemical Industries, Ltd., Osaka-fu (JP)

( * ) Notice: Subject to any disclaimer, the term of this patent is extended or adjusted under 35 U.S.C. 154(b) by 0 days.

(21) Appl. No.: 09/472,975

(22) Filed: Dec. 28, 1999

(30) Foreign Application Priority Data

Dec. 28, 1998 (JP) .................................... 10-372732
Feb. 26, 1999 (JP) .................................... 11-050266

(51) Int. Cl.[7] .............................. B01J 31/00; B01J 23/70; B32B 18/00; B32B 17/06; B32B 9/04
(52) U.S. Cl. .................... 502/159; 502/345; 502/350; 502/527.12; 502/527.13; 428/325; 428/428; 428/432; 428/446; 428/447; 428/448
(58) Field of Search ................... 502/150, 345, 502/350, 527.12, 527.13; 428/325, 428, 432, 446–448

(56) References Cited

U.S. PATENT DOCUMENTS

| | | | |
|---|---|---|---|
| 4,112,171 | * | 9/1978 | Motter et al. ............... 428/213 |
| 4,977,013 | * | 12/1990 | Ritchie et al. ............... 428/212 |
| 5,474,827 | * | 12/1995 | Crandall et al. ............. 428/67 |
| 5,853,866 | * | 12/1998 | Watanabe et al. ........... 428/312.8 |
| 5,869,187 | * | 2/1999 | Nakamura et al. .......... 428/428 |
| 5,961,843 | * | 10/1999 | Hayakawa et al. .......... 210/748 |
| 6,048,910 | * | 4/2000 | Furuya et al. ............... 522/86 |
| 6,103,854 | * | 8/2000 | Arakawa et al. ............ 528/196 |

* cited by examiner

*Primary Examiner*—Mark L. Bell
*Assistant Examiner*—Patricia L. Hailey
(74) *Attorney, Agent, or Firm*—Birch, Stewart, Kolasch & Birch, LLP

(57) ABSTRACT

The present invention is made to provide an organic-inorganic hybrid material, a surface of which is supplied with a layer having photo-catalysis, without photo-degradation of the substrate. The present invention provides an organic-inorganic hybrid material comprising a substrate, an intermediate layer and a photo-catalysis layer which are sequentially formed on a surface of the substrate wherein, the intermediate layer is composed of an organic-inorganic hybrid polymer material in which an organic polymer component and a metal oxide component are covalently bonded each other, which is obtained by hydrolyzing and polycondensing a solution or a wet gel which comprises an organic polymer having an alkoxymetal group as a functional group or an organic polymer having a functional group reactable with a metal alkoxide compound, and a metal alkoxide compound, and the photo-catalysis layer is composed of metal oxides having photo-catalysis.

28 Claims, 2 Drawing Sheets

ORGANIC-INORGANIC HYBRID MATERIALS AND PROCESSES FOR PREPARING THE SAME

FIELD OF THE INVENTION

The present invention relates to an organic-inorganic hybrid material, a surface of which is supplied with a layer having photo-catalysis, and process for preparing the material. The organic-inorganic hybrid material shows excellent photo-catalysis functions such as deodorizing, bleaching, antifouling, anti-bacterial, and/or sanitizing.

BACKGROUND OF THE INVENTION

Titanium oxide is the material having photo-catalysis. The photo-catalysis means that an active oxygen fragment such as OH radical and the like is formed on a surface of the titanium oxide when it is irradiated by light. The active oxygen fragment decomposes an organic substance present on the surface of the titanium oxide, and finally converts it into carbon dioxide and water. Therefore, the titanium oxide has recently been employed for removing organic substances present therearound such as odor, stain, fungus and the like.

The titanium oxide has generally been supported on a surface of an inorganic material such as tiles because the photo-catalysis of the titanium oxide is very active, and an organic material may be degraded remarkably if the organic material is brought into contact with the titanium oxide. If the titanium oxide is supported on an organic material, durability of the resulting material may become poor.

On the other hand, an organic material such as plastics and fibers is light-weight, easy to shape, and easy to handle. There is thus general needs for the material having photo-catalysis which is supported on an organic substrate.

Japanese Patent Laid Open Publication No. 171408/1995, and 265714/1995 disclose the method of employing an undecomposable resin such as a fluororesin and a silicone resin as a binder. Japanese Patent Laid Open Publication No. 157125/1991, and 213913/1995 disclose the method in which fine particles of titanium oxide is supported on a porous organic body. However, the titanium oxide directly contacts with an organic material such as a binder resin or a substrate even in the methods, and degradation of the material is not sufficiently prevented.

Japanese Patent Laid Open Publication No. 33988/1998 discloses the method in which titanium oxide particles are partially coated by alkyl silicate, and they are supported on an organic substrate. However, the photo-catalysis of the resulting material is poor because of a large amount of the alkyl silicate. Whereas, if the amount of the added alkyl silicate is reduced, contact area between the titanium oxide and the organic substrate becomes large, and durability of the resulting material becomes poor.

SUMMARY OF THE INVENTION

The present invention is made to provide an organic-inorganic hybrid material, a surface of which is supplied with a layer having photo-catalysis, without photo-degradation of the substrate.

The present invention provides an organic-inorganic hybrid material comprising a substrate, an intermediate layer and a photo-catalysis layer which are sequentially formed on a surface of the substrate wherein, the intermediate layer is composed of an organic-inorganic hybrid polymer material in which an organic polymer component and a metal oxide component are covalently bonded each other, which is obtained by hydrolyzing and polycondensing a solution or a wet gel which comprises an organic polymer having an alkoxymetal group as a functional group or an organic polymer having a functional group reactable with a metal alkoxide compound, and a metal alkoxide compound, and the photo-catalysis layer is composed of metal oxides having photo-catalysis.

The organic-inorganic hybrid material may generally be prepared by the process comprising the steps of:
  (i) providing a substrate having a surface;
  (ii) applying a solution or a wet gel which comprises an organic polymer having an alkoxymetal group as a functional group or an organic polymer having a functional group reactable with a metal alkoxide compound, and a metal alkoxide compound on the surface of the substrate to form an intermediate layer;
  (iii) forming a photo-catalysis layer which is composed of metal oxides having photo-catalysis on the surface of the intermediate layer.

Further, the present invention provides the organic-inorganic hybrid material which is excellent in mechanical strength, heat resistance, dimension stability, and chemical resistance.

That is, the present invention provides an organic-inorganic hybrid material comprising a substrate, an intermediate layer and a photo-catalysis layer which are sequentially formed on a surface of the substrate wherein,
  the intermediate layer is composed of an organic-inorganic hybrid component-gradient polymer material in which an organic polymer component and a metal oxide component are covalently bonded each other, and content of the metal oxide component is increased from the substrate in the direction of the photo-catalysis layer, and
  the photo-catalysis layer is composed of metal oxides having photo-catalysis.

The organic-inorganic hybrid material may generally be prepared by the process comprising the steps of:
  (i) providing a substrate having a surface;
  (ii) applying a solution or a wet gel which comprises an organic polymer having an alkoxymetal group as a functional group or an organic polymer having a functional group reactable with a metal alkoxide compound, and a metal alkoxide compound on the surface of the substrate to form a coated layer;
  (iii) altering a compositional ratio of the solution or the wet gel so that content of the metal oxide component is increased, and applying it thereon;
  (iv) repeating step (iii) at least one time to form the intermediate layer;
  (v) forming a photo-catalysis layer which is composed of metal oxides having photo-catalysis on the surface of the intermediate layer.

DETAILED DESCRIPTION OF THE INVENTION

Substrate

Figure 1:
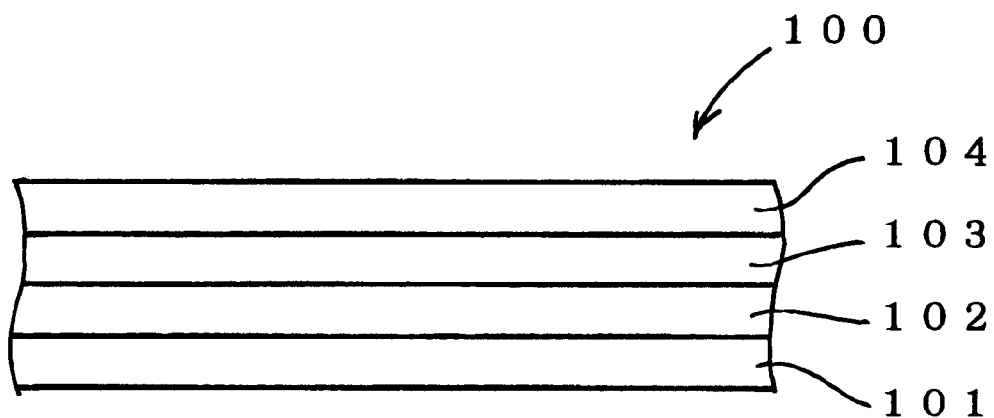
FIG. 1 is an illustrative sectional view which shows construction of the organic-inorganic hybrid material of Example 1 of the present invention.

Not only an inorganic material such as tiles but also an organic material can be used as a substrate. Examples of the organic material include a polymer material, e.g., general-purpose plastics such as a thermoplastic resin and a thermosetting resin, and engineering plastics. The shape thereof is not limited to, but may be plate, thread, film, ball, block, and various molded shapes. It is preferred that the organic material is light-weight and easy to shape.

Intermediate Layer

An intermediate layer is the layer which is placed between the substrate and the photo-catalysis layer. The intermediate layer prevents the substrate from contact with the photo-catalysis layer. It is preferred that the intermediate layer does not have photo-catalysis because the organic substrate is not degraded even if it is kept in contact with the intermediate layer. It is also preferred that the intermediate layer has good adhesiveness to the substrate and the photo-catalysis layer. The material preferred to be employed as the intermediate layer is an organic-inorganic hybrid polymer material in which an organic polymer component and a metal oxide component are covalently bonded each other.

An organic-inorganic hybrid material is prepared for example by hydrolyzing and polycondensing a solution or a wet gel which comprises an organic polymer having an alkoxymetal group as a functional group or an organic polymer (A) having a functional group reactable with a metal alkoxide compound, and a metal alkoxide compound (B).

Organic polymer (A)

Organic polymer (A) of the present invention is a polymer which has a functional group reactable with a metal alkoxide compound (B). Organic polymer (A) may be those prepared by any procedure.

As a backbone frame of organic polymer (A), thermoplastic resins or thermoplastic elastomer precursors such as polyethylene, polypropylene, polyvinyl chloride, polystyrene, polymethyl methacrylate, polyamide, polyacetal, polycarbonate, polyester, polyphenylene ether, polymethyl pentene, polysulfone, polyether sulfone, polyphthalamide, polyphenylene sulfide, polyarylate, polyimide, polyether imide, and polyether ketone; and thermosetting resin precursors such as phenol resin, epoxy resin, acrylic resin, melamine resin, alkyd resin, urea resin, and silicone resin.

The backbone frame of organic polymer (A) may be one component selected from the above described polymers or precursors, or may be a copolymer thereof. Organic polymer (A) may be a mixture of the plural polymers, and it may be linear or branched. Organic polymer (A) is preferably soluble or swellable in a solvent such as halogenated hydrocarbon, ether, alcohol, and aprotic polar solvent, and preferably has a number average molecular weight of from 500 to 50000, more preferably 1000 to 15000.

Among these, the thermoplastic resins are preferred, and engineering plastics such as polyamide, polyacetal, polycarbonate, polysulfone, and polyarylate are more preferred due to their high performance.

A functional group of organic polymer (A) may be those which is able to react with a functional group of metal alkoxide compound (B). The specific functional group of organic polymer (A) includes, but not limited to, an alkoxymetal group, a hydroxyl group, an amino group, a carboxyl group. An alkoxymetal group [-Metal(OR)$_n$] is particularly preferred.

The functional group equivalent of organic polymer (A) is generally 1 to 100, preferably 1 to 50, more preferably 2 to 10. If the functional group equivalent of organic polymer (A) is less than 1, performance of the resulting material may become poor, and is more than 100, the resulting material may become fragile.

Metal alkoxide compound (B)

Metal alkoxide compound (B) of the present invention is not limited to, and any class of them may be used. Provided that metal alkoxide compound (B) is that does not have photo-catalysis when it is converted to metal alkoxide. Preferred examples of metal alkoxide compound (B) are those represented by the formula (1):

wherein A represents an alkoxy group having 1 to 8, preferably 1 to 4 carbon atoms;

M represents metal element selected from the group consisting of Si, Zr, Fe, Sn, B, Al, Ge, Ce, Ta, Ba, Ga, Pb and W, preferably the group consisting of Si and Zr; and p represents an integer of 2 to 6.

Specific examples of metal alkoxide compound (B) include tetra-alkoxysilanes such as tetramethoxysilane, tetraethoxysilane, tetraisopropoxysilane, and tetrabutoxysilane;

zirconium tetra-alkoxides such as zirconium tetra-n-propoxide, zirconium tetra-iso-propoxide, and zirconium tetrabutoxide; and metal alkoxides such as barium diethoxide, boron trimethoxide, gallium triethoxide, aluminium tributoxide, germanium tetraethoxide, lead tetrabutoxide, tantalum penta-n-propoxide, and tungsten hexaethoxide.

The other examples of metal alkoxide compound (B) are those represented by the formula (2):

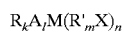

wherein R represents a hydrogen atom, an alkyl group having 1 to 12, preferably 1 to 5 carbon atoms, or a phenyl group, A represents an alkoxy group having 1 to 8, preferably 1 to 4 carbon atoms, M represents metal element selected from the group consisting of Si, Zr, Fe, Sn, B, Al, Ge, Ce, Ta, and W, preferably the group consisting of Si and Zr, R' represents an alkylene group or an alkylidene group having 1 to 4, preferably 2 to 4 carbon atoms, X represents a functional group selected from the group consisting of an isocyanato group, an epoxy group, a carboxyl group, an acid halide group, an acid anhydride group, an amino group, a thiol group, a vinyl group, a methacryl group, and a halogen atom, and k represents an integer of 0 to 5, 1 represents an integer of 1 to 5, m represents 0 or 1, n represents an integer of 0 to 5.

Specific examples of metal alkoxide compound (B) of which metal is silicone, include (alkyl)alkoxysilanes such as trimethoxysilane, triethoxysilane, tri-n-propoxysilane, dimethoxysilane, diethoxysilane, di-iso-propoxysilane, monomethoxysilane, monoethoxysilane, monobutoxysilane, methyldimethoxysilane, ethyldiethoxysilane, dimethylmethoxysilane, di-iso-propylisopropoxysilane, methyltrimethoxysilane, ethyltriethoxysilane, n-propyltri-n-propoxysilane, butyltributoxysilane, dimethyldimethoxysilane, diethyldiethoxysilane, di-isopropyldi-iso-propoxysilane, dibutyldibutoxysilane, trimethylmethoxysilane, triethylethoxysilane, tri-n-propyl-n-propoxysilane, tributylbutoxysilane, phenyltrimethoxysilane, diphenyldiethoxysilane, and triphenylmethoxysilane;

- (alkyl)alkoxysilanes having an isocyanato group such as 3-isocyanatopropyltrimethoxysilane, 3-isocyanatopropyltriethoxysilane, 2-isocyanatoethyltriethoxysilane, 2-isocyanatoethyltri-n-propoxysilane, 2-isocyanatoethylethyldibutoxysilane, 3-isocyanatopropylmethyldimethoxysilane, 3-isocyanatopropylethyldiethoxysilane, 3-isocyanatopropyldimethyl-iso-propoxysilane, 3-isocyanatopropyldiethylethoxysilane, 2-isocyanatoethyldiethylbutoxysilane, di(3-isocyanatopropyl)diethoxysilane, di(3-isocyanatopropyl)methylethoxysilane, and ethoxytri-isocyanatosilane;
- (alkyl)alkoxysilanes having an epoxy group such as 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-glycidoxypropyldimethylethoxysilane, 2-(3,4-epoxycyclohexyl)ethyltrimethoxysilane, and 3,4-epoxybutyltrimethoxysilane;
- (alkyl)alkoxysilanes having a carboxyl group such as carboxymethyltriethoxysilane, carboxymethylethyldiethoxysilane, and carboxyethyldimethylmethoxysilane;
- alkoxysilanes having an acid anhydride group such as 3-(triethoxysilyl)-2-methylpropylsuccinic anhydride;
- alkoxysilanes having a acid halide group such as 2-(4-chorosulfonyliphenyl)ethyltriethoxysilane;
- (alkyl)alkoxysilanes having an a mino group such as 3-aminopropyltrimethoxysilane, 3-aminopropyltriethoxysilane, N-2-(aminoethyl)-3-aminopropyltriethoxysilane, N-2-(aminoethyl)-3-aminopropylmethyldimethoxysilane, and N-phenyl-3-aminopropyltrimethoxysilane;
- (alkyl)alkoxysilanes having a thiol group such as 3-mercaptopropyltrimethoxysilane, 3-mercaptopropyltriethoxysilane, 2-mercaptoethyltriethoxysilane, and 3-mercaptopropylmethyldimethoxysilane;
- (alkyl)alkoxysilanes having a vinyl group such as vinyltrimethoxysilane, vinyltriethoxysilane, and vinylmethyldiethoxysilane;
- (alkyl)alkoxysilanes having a methacryl group such as 3-methacryloxypropyltrimethoxysilane, 3-methacryloxypropyltriethoxysilane, and 3-methacryloxypropylmethyldimethylsilane; and
- (alkyl)alkoxysilanes having a halogen atom such as triethoxyfluorosilane, 3-chloropropyltrimethoxysilane, 3-bromopropyltriethoxysilane, and 2-chloroethylmethyldimethoxysilane.

Substantially the same compounds as described above except that the metal element other than silicon, for example Zr, Fe, Sn, B, Al, Ge, Ce, Ta, or W is used, are also included in the scope of metal alkoxide compound (B) of the present invention.

Metal alkoxide compound (B) may be used alone or in combination of not less than two thereof. The metal alkoxide compound which includes not less than two kinds of metal such as $Mg[Al(iso-OC_3H_7)_4]_2$, $Ba[Zr_2(OC_2H_5)_9]_2$, $(C_3H_7O)_2Zr[Al(OC_3H_7)_4]_2$, or the oligomer type metal alkoxide compound which includes not less than two repeating unites in the molecule such as tetramethoxysilane oligomer, tetraethoxysilane oligomer are also employed. The alkoxy group of metal alkoxide compound (B) may be an acetoxy group.

The organic polymer (A) which has a hydroxyl group, an amino group, a carboxyl group and the like may be reacted with metal alkoxide compound (B) to obtain an organic polymer having an alkoxymetal group as a functional group. The organic polymer having an alkoxymetal group as a functional group has high reactivity, and is also included in the preferred examples of organic polymer (A). A method for preparing the organic polymer having an alkoxymetal group as a functional group is for example described in the specification of U.S. patent application Ser. No. 09/196787, page 17, line 21 to page 23, line 2.

Organic-inorganic hybrid polymer material

An organic-inorganic hybrid polymer material is for example prepared by the process of: a solution of organic polymer (A) which has a functional group reactable with a metal alkoxide compound (B), and metal alkoxide compound (B) is prepared; and the solution is hydrolyzed and polycondensed on the sol-gel reaction as described in the specification of U.S. patent application Ser. No. 09/196787, page 25, line 1 to page 26, line 13.

The content of the organic polymer component in the organic-inorganic hybrid polymer material is not particularly limited. However, when an organic substrate is employed, it is preferred that the content of the organic polymer component is not less than 50% by weight at the interface between the substrate and the intermediate layer in order to improve the adhesiveness to the organic substrate. Whereas, it is preferred that the content of the organic polymer component is close to 0% by weight, that is the content of the metal oxide component is close to 100% by weight at the interface between the intermediate layer and the material having photo-catalysis in order to prevent the degradation of the organic substrate.

The intermediate layer is preferred to have an internal structure in which content of an organic polymer component and a metal alkoxide component is constant in the direction parallel to the surface of the material, and the compositional ratio of a metal oxide component is gradually increased from the substrate in the direction of the photo-catalysis layer. The internal structure of the intermediate layer in which the content of a component is altered in the thickness direction is referred to as "component-gradient structure".

Thereby, the resulting organic-inorganic hybrid material becomes mechanically tough, and stable in dimension with aging and/or under heat or heat-shock, and becomes resistant to chemicals. That is, the organic-inorganic hybrid material having component-gradient structure is resistant to surface cracking, surface peeling, bowing or deformation, even if heat-shock or aging is applied.

The intermediate layer may be constructed to have double structure which is composed of the first intermediate layer, and the second intermediate layer. It is preferred that the second intermediate layer is composed of metal oxide which is obtained by hydrolyzing and polycondensing a metal alkoxide compound.

In this instance, the photo-catalysis layer contacts with the second intermediate layer composed of metal oxide, and does not contact with the first intermediate layer composed of the organic-inorganic hybrid polymer material. Thereby, the degradation of not only the organic substrate but also of an organic moiety of the organic-inorganic hybrid polymer material is prevented. As a result, durability of the resulting organic-inorganic hybrid material is sufficiently improved.

Throughout the specification, the hydrolysis and polycondensation on the sol-gel process means the reaction process in which a polymer having an alkoxymetal group reacts with water, the alkoxymetal group converts to a hydroxyl group, and the hydroxyl group is simultaneously polycondensed with an adjacent hydroxymetal group (e.g., —SiOH) or an adjacent alkoxymetal group by dehydration or elimination of alcohol to form three-dimensional crosslinkage composed of inorganic covalent bond. The polycondensation reaction typically occurs due to dehydration between two hydroxymetal groups, but the dehydration may occur between a hydroxymetal group and a functional group having an active hydrogen such as the other hydroxyl group, an amino group, and a carboxyl group.

The water may be added to the reaction process in the amount sufficient for converting all of the alkoxy group to the hydroxyl group. Otherwise, water present in the reaction mixture, or moisture of an atmosphere may be utilized.

The reaction is preferably conducted at from room temperature to 100° C. for 0.5 to 24 hours. An acidic catalyst such as hydrochloric acid, sulfonic acid, acetic acid, benzenesulfonic acid, and p-toluenesulfonic acid, or a basic catalyst such as sodium hydroxide, potassium hydroxide, ammonia, triethylamine, piperidine, and 1,8-diazabicyclo-[5,4,0]-7-undecene (DBU), may also be employed.

The metal selected from the group consisting of Si, Ti, Zr, Fe, Cu, Sn, B, Al, Ge, Ce, Ta, and W, and a metal compound thereof such as metal oxide, metal complex, metal salt, and the like may further be employed in the hydrolysis and polycondensation reaction of the present invention, in view of further improving strength, hardness, weather resistance, chemical resistance, flame resistance, static resistance of the resulting material; for newly supplying the performance to the material; or for controlling the inorganic content or the crosslinking density of the material.

An anti-drying agent such as formamide, dimethylformamide, dioxane, oxalic acid, or the other additives such as acetyl acetone, and the like may be included in the reaction mixture for the hydrolysis and polycondensation reaction of the present invention for preventing from forming the crack during the drying process.

The thickness after dried of the intermediate layer is generally 0.01 to 1000 μm, preferably 0.1 to 100 μm. If the thickness is more than 1000 μm, long term is required for forming the layer, and large amount of raw material is also required, result in high cost. If the thickness is less than 0.01 μm, pinhole may be formed in the layer result in poor performance.

In the case where the intermediate layer is constructed to have double structure which is composed of the first intermediate layer, and the second intermediate layer, the thickness after dried of the first intermediate layer is generally 0.01 to 1000 μm, preferably 0.1 to 100 μm. If the thickness is more than 1000 μm, long term is required for forming the layer, and large amount of raw material is also required, result in high cost. If the thickness is less than 0.01 μm, pinhole may be formed in the layer result in poor performance.

The thickness after dried of the second intermediate layer is generally 0.01 to 100 μm, preferably 0.1 to 10 μm. If the thickness is more than 100 μm, crack or peeling of the layer may be occurred. If the thickness is less than 0.01 μm, pinhole may be formed in the layer result in poor performance.

Photo-catalysis Layer

A photo-catalysis layer is the layer which is composed of a material having photo-catalysis. It is preferred that the photo-catalysis is strong. Shape of the material having photo-catalysis is not particularly limited, but it is preferred that the surface area of the material is large because the photo-catalysis is improved.

In the case where the shape of the material having photo-catalysis is particulate, the particle size is preferably not more than 100 μm. If the particle size is more than 100 μm, appearance or tactile sensation of the resulting material may become poor. It is preferred that the particle size is small because the smaller the particle size, the more active the photo-catalysis of the material.

Examples of the material having photo-catalysis include the metal oxide having photo-catalysis (C). Metal oxide (C) may be employed in alone or in combination of not less than two kinds. Metal oxide (C) may be that comprises not less than two metal elements in one molecule. Metal oxide (C) may be that comprises additional inorganic substance in order to improve photo-catalysis, mechanical strength, flexibility, and the like.

Preferred examples of metal oxide (C) include titanium oxide, and cuprous oxide. The titanium oxide is that obtained by the method known to those skilled in the art, for example the method in which titanyl sulfate, titanium tetrachloride, titanate or the like is neutralized or hydrolyzed, or the method in which titanium tetrachloride is oxidized at gas phase. The titanium oxide of anatase type, rutile type, amorphous type, hydrated type, or a combination thereof may generally be employed.

The cuprous oxide is obtained by the method in which cuprous chloride is hydrolyzed, or the method in which cupric oxide or cupric hydroxide is reduced.

The content of metal oxide (C) in the photo-catalysis layer is generally from 10 to 100% by weight, preferably 20 to 100% by weight.

Metal oxide (C) may be the inorganic polymer material obtained by hydrolyzing and polycondensing a solution or a wet gel which comprises a metal alkoxide compound. Metal element of the metal alkoxide compound is that have photo-catalysis when it is oxidized.

Preferred examples of the metal alkoxide compound include the compound represented by the formula (1) in which central metal M is Ti, Cu and the like, and the compound represented by the formula (2) in which central metal M is Ti, Cu and the like. For example, titanium tetraalkoxides such as titanium tetramethoxide, titanium tetraethoxide, titanium tetra-n-propoxide, titanium tetraisopropoxide, and titanium tetrabutoxide; and cupric dialkoxides such as cupric dimethoxide, cupric diethoxide, cupric di-n-propoxide, cupric diisopropoxide, and cupric dibutoxide are included.

The metal alkoxide may be employed in alone or in combination of not less than two kinds. The metal alkoxide may be that comprises not less than two metal elements in one molecule, that includes not less than two repeating unites in one molecule, or that has an acetoxy group or an acetyl acetoxy group in place of an alkoxy group.

The photo-catalysis layer may have the component-gradient structure in which content of metal oxide (C) is gradually increased from the intermediate layer in the direction of surface. In this instance, the content of metal oxide (C) is controlled in the range from 10 to 100% by weight. However, the highest region preferably comprises metal oxide (C) in an amount from 50 to 100% by weight.

The dry thickness of the photo-catalysis layer is generally 0.01 to 100 μm, preferably 0.1 to 100% by weight. If the thickness is more than 100 μm, crack or peeling of the layer may be occurred. If the thickness is less than 0.01 μm, pinhole may be formed in the layer result in poor performance.

Preparation of Organic-Inorganic Hybrid Material

The organic-inorganic hybrid material of the present invention is prepared by the sol-gel reaction of an organic polymer which has a functional group reactable with a metal alkoxide compound, and a metal alkoxide compound.

A mixture of an organic polymer which has a functional group reactable with a metal alkoxide compound, and a metal alkoxide compound is dissolved in a suitable solvent, an acid compound or a base compound is optionally added as a catalyst to conduct hydrolysis. A substrate having a surface is then provided, the resulting solution or wet gel is applied on the surface of the substrate, and the solvent is partially dried to form an intermediate layer. The drying of the intermediate layer may be conducted under room temperature or raised temperature.

It is preferred that the drying of the intermediate layer is conducted as minimum as possible because adhesiveness to the layer placed thereon (the second intermediate layer, or photo-catalysis layer) is improved.

When the intermediate layer have the component-gradient structure, it is for example prepared as follows. The first mixed composition including organic polymer (A) and metal alkoxide compound (B) in a certain compositional ratio is prepared. The first mixed composition is then hydrolyzed to obtain the first partially condensed wet gel. The first partially condensed wet gel is applied on the surface of the substrate to form the first layer. The first layer preferably contains an organic polymer component in an amount of not less than 50% by weight based on solid.

The second mixed composition including organic polymer (A) and metal alkoxide compound (B), the compositional ratio of which is slightly changed from the first mixed composition, is prepared. The second mixed composition is hydrolyzed to obtain the second partially condensed wet gel. The second partially condensed wet gel is applied on a surface of the first layer to form the second layer.

The procedures of this step are then severally repeated, and some layers are overlapped to complete the intermediate layer. The content of the organic polymer component is finally reduced to 30% by weight, preferably 10% by weight based on solid.

Each of the applied layers may be dried or not dried before the next layer is applied. When it is dried, the drying may be conducted under room temperature or raised temperature. It is preferred that the drying of the layer is conducted as minimum as possible because adhesiveness with the layer placed thereon is improved.

When the organic-inorganic hybrid material has the second intermediate layer, a solution or a wet gel of metal alkoxide, metal element of which does not have photo-catalysis when it is oxidized, is applied on the surface of the (first) intermediate layer.

The photo-catalysis layer which is comprised of the material having photo-catalysis is formed on the intermediate layer, or on the second intermediate layer. It is preferred that metal oxide having photo-catalysis (C) is employed as the material having photo-catalysis.

The photo-catalysis layer is formed, for example, by the process in which a metal oxide powder (particles) comprising metal oxide (C) is dispersed in a volatile solvent, and the resulting dispersion is applied on the intermediate layer, or the process in which metal oxide (C) in the form of powder is directly applied on the intermediate layer in the form of wet gel. Otherwise, a solution or a wet gel of metal alkoxide, of which metal element has photo-catalysis when it is oxidized, may be applied on the surface of the intermediate layer to form the photo-catalysis layer.

When the photo-catalysis layer has the component-gradient structure, it is for example prepared as follows. Some kinds of solutions or wet gels containing metal oxide (C) in some gradually altered amounts respectively are prepared, and each of the solution or wet gel is sequentially applied so that the component-gradient structure is completed.

After all the layers are formed on the substrate, the layers may be dried. The drying may be conducted under room temperature or raised temperature. The drying is conducted for example at 50 to 500° C. for 5 minutes to 48 hours in order to proceed condensation reaction and to make rigid crosslinkage.

Technical Effects of the Invention

The organic-inorganic hybrid material of the present invention has an intermediate layer which is placed between the substrate and the photo-catalysis layer. The intermediate layer is composed of the organic-inorganic hybrid polymer material which satisfactorily has the inherent characteristics in an inorganic material such as heat resistance, surface hardness, rigidity, water resistance, chemical resistance, mechanical properties and the like. Thereby, the substrate which supports the material is prevented from degradation due to the photo-catalysis even if an organic material is used as the substrate, and durability of the organic-inorganic hybrid material is prolonged.

When the intermediate layer have component-gradient structure, the adhesiveness between the layers is remarkably improved. Thereby, the resulting organic-inorganic hybrid material becomes mechanically tough, and stable in dimension with aging and/or under heat or heat-shock, and becomes resistant to chemicals.

The organic-inorganic hybrid material of the present invention is a high-performance and high-functional material excellent in deodorant ability, resistance to stain, fungus and the like, nevertheless is light-weight and easy to shape. Therefore, it is applicable to for example, plastic molded article, film, construction material, optical material, surface modifying agent, hard coating agent, electric or electronic material, medical material and the like.

EXAMPLES

The present invention is illustrated by the following examples which, however, are not to be construed as limiting the present invention to their details.

Preparation Example 1

70.0 g of polycarbonate diol (PC-diol) having a number average molecular weight of 3900, and a hydroxyl group equivalent of 1.8 was dissolved into 500 mL of chloroform. To the solution was added 13.3 g of 3-isocyanatopropyltriethoxysilane (IPTES), heated with refluxing for 10 hours, and cooled to room temperature. The reaction mixture was dropwise added to 7 L of methanol to precipitate the reaction product. The precipitated substance was filtered off, washed with methanol, and dried in vacuo (97% yield).

$^1$H-NMR spectrum showed that the reaction product was alkoxysilylated polycarbonate in which an alkoxysilyl group is introduced at the both ends of the polycarbonate (PCS). The alkoxysilyl group equivalent of the reaction product was 1.8. The number average molecular weight of the reaction product was determined to be 4400 by GPC measurement.

The detailed conditions for determining the molecular weight are as follows.

| | |
|---|---|
| Apparatus | Model HLC8020 made by Tosoh Corp. |
| Column | KF-806L × 2 and KF-803L × 1 (three columns were coupled) made by Showadenko Co., Ltd. |
| Pre-column | KF-2000 made by Showadenko Co., Ltd. |
| Carrier | THF |
| Temperature | 40° C. |
| Flow rate | 1.0 ml/min. |
| Detector | Refractometer |
| Recorder | Model SC-8020 made by Tosoh Corp. |
| Conversion standard | Polystyrene |

Preparation Example 2

26.0 g of polysulfone diol having a number average molecular weight of 5200, and a hydroxyl group equivalent of 1.7 was dissolved into 300 mL of chloroform. To the solution was added 3.5 g of IPTES, heated with refluxing for 11 hours, and cooled to room temperature. The reaction mixture was dropwise added to 3 L of methanol to precipitate the reaction product. The precipitated substance was filtered off, washed with methanol, and dried in vacuo (96% yield).

$^1$H-NMR spectrum showed that the reaction product was alkoxysilylated polysulfone in which an alkoxysilyl group is introduced at the both ends of the polysulfone (PSS). The alkoxysilyl group equivalent of the reaction product was 1.7. The number average molecular weight of the reaction product was determined to be 6000 by GPC measurement.

Preparation Example 3

30.5 g of polyarylate diol having a number average molecular weight of 6100, and a hydroxyl group equivalent of 1.6 was dissolved into 300 mL of chloroform. To the solution was added 3.2 g of IPTES, heated with refluxing for 15 hours, and cooled to room temperature. The reaction mixture was dropwise added to 3 L of methanol to precipitate the reaction product. The precipitated substance was filtered off, washed with methanol, and dried in vacuo (96% yield).

$^1$H-NMR spectrum showed that the reaction product was alkoxysilylated polyarylate in which an alkoxysilyl group is introduced at the both ends of the polyarylate (PAS). The alkoxysilyl group equivalent of the reaction product was 1.6. The number average molecular weight of the reaction product was determined to be 6700 by GPC measurement.

Example 1

5.0 g of the PCS having a number average molecular weight of 4400 prepared in Preparation Example 1 is dissolved in 50 ml of tetrahydrofuran (THF), and hydrolyzed by using 0.15 g of 1N aqueous hydrochloric acid at room temperature to obtain a solution. The solution was coated on a polycarbonate substrate by using a spin coater to form the first intermediate layer.

5.0 g of tetraethoxysilane (TEOS) was dissolved in 25 ml of THF, and hydrolyzed by using 2.0 g of 1N aqueous hydrochloric acid at room temperature to prepare a solution. The solution was coated on the surface of the first intermediate layer by using a spin coater to form the second intermediate layer.

5.0 g of anatase type titanium oxide having an average particle size of 5 μm was dispersed in 25 ml of THF. The dispersion was coated on the surface of the second intermediate layer by using a spin coater to form the photo-catalysis layer.

The coated material was allowed to stand at room temperature for 1 day, and heated at 100° C. for 10 hours.

As a result, the organic-inorganic hybrid material (100) as shown in FIG. 1 which has the polycarbonate substrate (101), the first intermediate layer (102) composed of crosslinked PCS, the second intermediate layer (103) composed of silica, and the photo-catalysis layer (104) composed of titanium oxide particles was obtained.

Example 2

5.0 g of the PCS having a number average molecular weight of 4400 prepared in Preparation Example 1 is dissolved in 50 ml of THF, and hydrolyzed by using 0.15 g of 1N aqueous hydrochloric acid at room temperature to obtain a solution. The solution was coated on a polycarbonate substrate by using a spin coater to form the first intermediate layer.

5.0 g of TEOS was dissolved in 25 ml of THF, and hydrolyzed by using 2.0 g of 1N aqueous hydrochloric acid at room temperature to prepare a solution. The solution was coated on the surface of the first intermediate layer by using a spin coater to form the second intermediate layer.

5.0 g of titanium tetrabutoxide was dissolved in 25 ml of THF and hydrolyzed by using 1.0 g of 1N aqueous hydrochloric acid at room temperature to prepare a solution. The solution was coated on the surface of the second intermediate layer by using a spin coater to form the photo-catalysis layer.

The coated material was allowed to stand at room temperature for 1 day, and heated at 100° C. for 10 hours.

As a result, the organic-inorganic hybrid material which has the polycarbonate substrate, the first intermediate layer composed of crosslinked PCS, the second intermediate layer composed of silica, and the photo-catalysis layer composed of titanium oxide was obtained.

Example 3

2.5 g of the PCS having a number average molecular weight of 4400 prepared in Preparation Example 1, and 2.5 g of TEOS were dissolved in 40 ml of THF, and hydrolyzed by using 1.0 g of 1N aqueous hydrochloric acid at room temperature to obtain a solution. The solution was coated on a polycarbonate substrate by using a spin coater to form the intermediate layer.

2.5 g of TEOS, and 2.5 g of anatase type titanium oxide having an average particle size of 5 μm were dispersed in 25 ml of THF, and hydrolyzed by using 1.0 g of 1N aqueous hydrochloric acid at room temperature to prepare a dispersion. The dispersion was coated on the surface of the intermediate layer by using a spin coater to form the photo-catalysis layer.

The coated material was allowed to stand at room temperature for 1 day, and heated at 100t for 10 hours.

Figure 2:
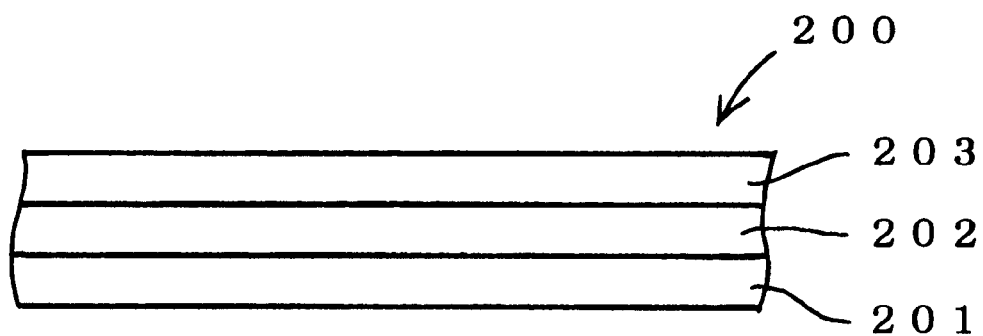
FIG. 2 is an illustrative sectional view which shows construction of the organic-inorganic hybrid material of Example 3 of the present invention.

As a result, the organic-inorganic hybrid material (200) as shown in FIG. 2 which has the polycarbonate substrate (201), the intermediate layer (202) composed of silica/ crosslinked PCS, and the photo-catalysis layer (203) composed of silica/titanium oxide particles was obtained.

Example 4

2.5 g of the PCS having a number average molecular weight of 4400 prepared in Preparation Example 1, and 2.5 g of TEOS were dissolved in 40 ml of THF, and hydrolyzed by using 1.0 g of 1N aqueous hydrochloric acid at room temperature to obtain a solution. The solution was coated on a polycarbonate substrate by using a spin coater to form the intermediate layer.

2.5 g of TEOS, and 2.5 g of cuprous oxide were dispersed in 25 ml of THF, and hydrolyzed by using 1.0 g of 1N aqueous hydrochloric acid at room temperature to prepare a dispersion. The dispersion was coated on the surface of the intermediate layer by using a spin coater to form the photo-catalysis layer.

The coated material was allowed to stand at room temperature for 1 day, and heated at 100° C. for 10 hours.

As a result, the organic-inorganic hybrid material which has the polycarbonate substrate, the intermediate layer composed of silica/crosslinked PCS, and the photo-catalysis layer composed of silica/cuprous oxide particles was obtained.

Example 5

5.0 g of the PSS having a number average molecular weight of 6000 prepared in Preparation Example 2 is dissolved in 50 ml of THF, and hydrolyzed by using 0.10 g of 1N aqueous hydrochloric acid at room temperature to obtain a solution. The solution was coated on a polycarbonate substrate by using a spin coater to form the first intermediate layer.

5.0 g of tetramethoxysilane oligomer having a number average molecular weight of 1000 available from Mitsubishi Kagaku K.K. as MKC SILICATE MS-56 (TMOS) was dissolved in 25 ml of THF, and hydrolyzed by using 2.0 g of 1N aqueous hydrochloric acid at room temperature to prepare a solution. The solution was coated on the surface of the first intermediate layer by using a spin coater to form the second intermediate layer.

5.0 g of anatase type titanium oxide having an average particle size of 5 μm was dispersed in 25 ml of THF. The dispersion was coated on the surface of the second intermediate layer by using a spin coater to form the photo-catalysis layer.

The coated material was allowed to stand at room temperature for 1 day, and heated at 100° C. for 10 hours.

As a result, the organic-inorganic hybrid material which has the polycarbonate substrate, the first intermediate layer composed of crosslinked PSS, the second intermediate layer composed of silica, and the photo-catalysis layer composed of titanium oxide particles was obtained.

Example 6

5.0 g of the PSS having a number average molecular weight of 6000 prepared in Preparation Example 2 is dissolved in 50 ml of THF, and hydrolyzed by using 0.10 g of 1N aqueous hydrochloric acid at room temperature to obtain a solution. The solution was coated on a polycarbonate substrate by using a spin coater to form the first intermediate layer.

5.0 g of TMOS was dissolved in 25 ml of THF, and hydrolyzed by using 2.0 g of 1N aqueous hydrochloric acid at room temperature to prepare a solution. The solution was coated on the surface of the first intermediate layer by using a spin coater to form the second intermediate layer.

5.0 g of titanium tetrabutoxide oligomer having a number average molecular weight of 970 was dissolved in 25 ml of THF and hydrolyzed by using 0.9 g of 1N aqueous hydrochloric acid at room temperature to prepare a solution. The solution was coated on the surface of the second intermediate layer by using a spin coater to form the photo-catalysis layer.

The coated material was allowed to stand at room temperature for 1 day, and heated at 100° C. for 10 hours.

As a result, the organic-inorganic hybrid material which has the polycarbonate substrate, the first intermediate layer composed of crosslinked PSS, the second intermediate layer composed of silica, and the photo-catalysis layer composed of titanium oxide was obtained.

Example 7

2.5 g of the PSS having a number average molecular weight of 6000 prepared in Preparation Example 2, and 2.5 g of TMOS were dissolved in 40 ml of THF, and hydrolyzed by using 1.0 g of 1N aqueous hydrochloric acid at room temperature to obtain a solution. The solution was coated on a polycarbonate substrate by using a spin coater to form the intermediate layer.

2.5 g of TMOS, and 2.5 g of anatase type titanium oxide having an average particle size of 5 μm were dispersed in 25 ml of THF, and hydrolyzed by using 1.0 g of 1N aqueous hydrochloric acid at room temperature to prepare a dispersion. The dispersion was coated on the surface of the intermediate layer by using a spin coater to form the photo-catalysis layer.

The coated material was allowed to stand at room temperature for 1 day, and heated at 100° C. for 10 hours.

As a result, the organic-inorganic hybrid material which has the polycarbonate substrate, the intermediate layer composed of silica/crosslinked PSS, and the photo-catalysis layer composed of silica/titanium oxide particles was obtained.

Example 8

2.5 g of the PSS having a number average molecular weight of 6000 prepared in Preparation Example 2, and 2.5 g of TMOS were dissolved in 40 ml of THF, and hydrolyzed by using 1.0 g of 1N aqueous hydrochloric acid at room temperature to obtain a solution. The solution was coated on a polycarbonate substrate by using a spin coater to form the intermediate layer.

2.5 g of TMOS, and 2.5 g of cuprous oxide were dispersed in 25 ml of THF, and hydrolyzed by using 1.0 g of 1N aqueous hydrochloric acid at room temperature to prepare a dispersion. The dispersion was coated on the surface of the intermediate layer by using a spin coater to form the photo-catalysis layer.

The coated material was allowed to stand at room temperature for 1 day, and heated at 100° C. for 10 hours.

As a result, the organic-inorganic hybrid material which has the polycarbonate substrate, the intermediate layer composed of silica/crosslinked PSS, and the photo-catalysis layer composed of silica/cuprous oxide particles was obtained.

Example 9

5.0 g of the PAS having a number average molecular weight of 6700 prepared in Preparation Example 3 is dissolved in 50 ml of THF, and hydrolyzed by using 0.10 g of 1N aqueous hydrochloric acid at room temperature to obtain a solution. The solution was coated on a polycarbonate substrate by using a spin coater to form the first intermediate layer.

5.0 g of TMOS was dissolved in 25 ml of THF, and hydrolyzed by using 2.0 g of 1N aqueous hydrochloric acid at room temperature to prepare a solution. The solution was coated on the surface of the first intermediate layer by using a spin coater to form the second intermediate layer.

5.0 g of cuprous oxide particles were dispersed in 25 ml of THF. The dispersion was coated on the surface of the second intermediate layer by using a spin coater to form the photo-catalysis layer.

The coated material was allowed to stand at room temperature for 1 day, and heated at 100° C. for 10 hours.

As a result, the organic-inorganic hybrid material which has the polycarbonate substrate, the first intermediate layer composed of crosslinked PAS, the second intermediate layer composed of silica, and the photo-catalysis layer composed of cuprous oxide particles was obtained.

Example 10

5.0 g of the PAS having a number average molecular weight of 6700 prepared in Preparation Example 3 is dissolved in 50 ml of THF, and hydrolyzed by using 0.10 g of 1N aqueous hydrochloric acid at room temperature to obtain a solution. The solution was coated on a polycarbonate substrate by using a spin coater to form the first intermediate layer.

5.0 g of TMOS was dissolved in 25 ml of THF, and hydrolyzed by using 2.0 g of 1N aqueous hydrochloric acid at room temperature to prepare a solution. The solution was coated on the surface of the first intermediate layer by using a spin coater to form the second intermediate layer.

5.0 g of titanium tetraisopropoxide was dissolved in 25 ml of THF and hydrolyzed by using 1.2 g of 1N aqueous hydrochloric acid at room temperature to prepare a solution. The solution was coated on the surface of the second intermediate layer by using a spin coater to form the photo-catalysis layer.

The coated material was allowed to stand at room temperature for 1 day, and heated at loot for 10 hours.

As a result, the organic-inorganic hybrid material which has the polycarbonate substrate, the first intermediate layer composed of crosslinked PAS, the second intermediate layer composed of silica, and the photo-catalysis layer composed of titanium oxide was obtained.

Example 11

2.5 g of the PAS having a number average molecular weight of 6700 prepared in Preparation Example 3, and 2.5 g of TMOS were dissolved in 40 ml of THF, and hydrolyzed by using 1.0 g of 1N aqueous hydrochloric acid at room temperature to obtain a solution. The solution was coated on a polycarbonate substrate by using a spin coater to form the intermediate layer.

2.5 g of TMOS, and 2.5 g of anatase type titanium oxide having an average particle size of 5 μm were dispersed in 25 ml of THF, and hydrolyzed by using 1.0 g of 1N aqueous hydrochloric acid at room temperature to prepare a dispersion. The dispersion was coated on the surface of the intermediate layer by using a spin coater to form the photo-catalysis layer.

The coated material was allowed to stand at room temperature for 1 day, and heated at 100° C. for 10 hours.

As a result, the organic-inorganic hybrid material which has the polycarbonate substrate, the intermediate layer composed of silica/crosslinked PAS, and the photo-catalysis layer composed of silica/titanium oxide particles was obtained.

Example 12

2.5 g of the PAS having a number average molecular weight of 6700 prepared in Preparation Example 3, and 2.5 g of TMOS were dissolved in 40 ml of THF, and hydrolyzed by using 1.0 g of 1N aqueous hydrochloric acid at room temperature to obtain a solution. The solution was coated on a polycarbonate substrate by using a spin coater to form the intermediate layer.

2.5 g of TMOS, and 2.5 g of cuprous oxide were dispersed in 25 ml of THF, and hydrolyzed by using 1.0 g of 1N aqueous hydrochloric acid at room temperature to prepare a dispersion. The dispersion was coated on the surface of the intermediate layer by using a spin coater to form the photo-catalysis layer.

The coated material was allowed to stand at room temperature for 1 day, and heated at 100° C. for 10 hours.

As a result, the organic-inorganic hybrid material which has the polycarbonate substrate, the intermediate layer composed of silica/crosslinked PAS, and the photo-catalysis layer composed of silica/cuprous oxide particles was obtained.

Comparative Example 1

2.5 g of TEOS, and 2.5 g of anatase type titanium oxide having an average particle size of 5 μm were dispersed in 25 ml of THF, and hydrolyzed by using 1.0 g of 1N aqueous hydrochloric acid at room temperature to prepare a dispersion. The dispersion was coated on the surface of the polycarbonate substrate to form the photo-catalysis layer.

The coated material was allowed to stand at room temperature for 1 day, and heated at 100° C. for 10 hours.

Comparative Example 2

2.5 g of TMOS, and 2.5 g of cuprous oxide were dispersed in 25 ml of THF, and hydrolyzed by using 1.0 g of 1N aqueous hydrochloric acid at room temperature to prepare a dispersion. The dispersion was coated on the surface of the polycarbonate substrate to form the photo-catalysis layer.

The coated material was allowed to stand at room temperature for 1 day, and heated at 100° C. for 10 hours.

Comparative Example 3

5.0 g of titanium tetrabutoxide was dissolved in 25 ml of THF, and hydrolyzed by using 1.0 g of 1N aqueous hydrochloric acid at room temperature to prepare a solution. The solution was coated on the surface of the polycarbonate substrate to form the photo-catalysis layer.

The coated material was allowed to stand at room temperature for 1 day, and heated at 100° C. for 10 hours.

Comparative Example 4

2.5 g of the PCS having a number average molecular weight of 4400 prepared in Preparation Example 1, and 2.5 g of anatase type titanium oxide having an average particle size of 5 μm were dispersed in 40 ml of THF, and hydrolyzed by using 0.1 g of 1N aqueous hydrochloric acid at room temperature to prepare a dispersion. The dispersion was coated on the surface of the polycarbonate substrate to form the photo-catalysis layer.

The coated material was allowed to stand at room temperature for 1 day, and heated at 100° C. for 10 hours.

Comparative Example 5

2.5 g of the PCS having a number average molecular weight of 4400 prepared in Preparation Example 1, and 2.5 g of cuprous oxide particles were dispersed in 40 ml of THF, and hydrolyzed by using 0.1 g of 1N aqueous hydrochloric acid at room temperature to prepare a dispersion. The dispersion was coated on the surface of the polycarbonate substrate to form the photo-catalysis layer.

The coated material was allowed to stand at room temperature for 1 day, and heated at 100° C. for 10 hours.

Cross Cut Tape Test

Adhesiveness of the coated layer of the organic-inorganic hybrid materials prepared in Examples 1 to 12, and Comparative Examples 1 to 3 were tested substantially according to JIS K 5400.

A grid including 100 squares made of orthogonal eleven-by-eleven parallel lines spaced 1 mm, was made on a surface of a test piece (30×30 mm) by using a cutter knife. An adhesive tape available from Nichiban K.K. as the trade name of CELLOPHANE TAPE was applied and adhered to the squares of the coated layer, the adhesive tape was peeled off quickly, and observed whether the coated layer was detached or not. The results were shown in Table 1.

Nearly all the squares of the coated layer were detached on the test pieces of Comparative Examples 1 to 3. Whereas, no square of the coated layer was detached on test pieces of Examples 1 to 12. The results show that the organic-inorganic hybrid material of the present invention has excellent interface strength.

TABLE 1

Cross Cut Tape Test

| Test piece | Unpeeled squares | Test piece | Unpeeled squares |
|---|---|---|---|
| Example 1 | 100/100 | Example 9 | 100/100 |
| Example 2 | 100/100 | Example 10 | 100/100 |
| Example 3 | 100/100 | Example 11 | 100/100 |
| Example 4 | 100/100 | Example 12 | 100/100 |
| Example 5 | 100/100 | C. Ex. 1 | 10/100 |
| Example 6 | 100/100 | C. Ex. 2 | 3/100 |
| Example 7 | 100/100 | C. Ex. 3 | 5/100 |
| Example 8 | 100/100 | | |

Accelerated Weathering Test

Weather resistance of the organic-inorganic hybrid materials prepared in Examples 1 to 12, and Comparative Examples 4 and 5 were tested by using a weatherometer substantially according to JIS D 0205.

Weathering of a test piece (150×70 mm) was conducted under the following conditions:

| Apparatus | WEL-75XS-HC-BEC TYPE XENON SUNSHINE LONG LIFE WEATHEROMETER available from Sugai Shikenki K.K. |
|---|---|
| Average discharge electric power | 390 W/m² |
| Spray pressure of water | 1.0 kgf/cm² |
| Water amount | 2000 ml/min |
| Spray period | A cycle of 12 min. water spray every 1 hr. |
| Test period | 200 hours |

The test piece was taken out from the weatherometer after the weathering, and the substrate thereof was visually observed.

Discoloration of the substrate was observed on the test pieces of Comparative Examples 4 and 5, and no change was observed on the test pieces of Examples 1 to 12. The results were shown in Table 2.

It is thought that the substrate of the test piece of Comparative Example is oxidized and discolored because the substrate directly contacts with titanium oxide or cuprous oxide. Whereas, the substrate of the test piece of Example is not oxidized because the substrate and the titanium oxide or the cuprous oxide, are separated by the silica layer.

TABLE 2

Accelerated Weathering Test

| Test piece | Substrate appearance | Test piece | Substrate appearance |
|---|---|---|---|
| Example 1 | ○ | Example 8 | ○ |
| Example 2 | ○ | Example 9 | ○ |
| Example 3 | ○ | Example 10 | ○ |
| Example 4 | ○ | Example 11 | ○ |
| Example 5 | ○ | Example 12 | ○ |
| Example 6 | ○ | C. Ex. 4 | x |
| Example 7 | ○ | C. Ex. 5 | x |

○: No change was observed.
x: Change such as discoloration was observed.

Ability of Deodorizing Test for Tobacco Odor

The ability of deodorizing for tobacco odor of the organic-inorganic hybrid materials prepared in Examples 1 to 12, and polycarbonate plate was tested.

A 900 ml wide mouthed bottle was set upside down, and a cigarette emitting smoke was placed just below the mouth of the bottle for 5 seconds. A test piece (30×30 mm) was put in the bottle and the mouth of the bottle was sealed. The bottle was allowed to stand under outdoor sunlight for 1 hour. Thereafter, the mouth was opened, and the odor inside the bottle was evaluated. The results were shown in Table 3.

Tobacco odor was found in the bottle of the polycarbonate plate, but no odor was found in the bottles of the test pieces of Examples 1 to 12.

The organic-inorganic hybrid material of the present invention had excellent ability of deodorizing for tobacco odor.

TABLE 3

Ability of Deodorizing Test for Tobacco Odor

| Test piece | Odor | Test piece | Odor |
|---|---|---|---|
| Example 1 | ○ | Example 8 | ○ |
| Example 2 | ○ | Example 9 | ○ |
| Example 3 | ○ | Example 10 | ○ |
| Example 4 | ○ | Example 11 | ○ |

TABLE 3-continued

Ability of Deodorizing Test for Tobacco Odor

| Test piece | Odor | Test piece | Odor |
|---|---|---|---|
| Example 5 | o | Example 12 | o |
| Example 6 | o | Polycarbonate | x |
| Example 7 | o | | | o: No or little odor remained.
x: Strong odor remained.

Ability of Deodorizing Test for Ammonia Odor

The ability of deodorizing for ammonia odor of the organic-inorganic hybrid materials prepared in Examples 1 to 12, and polycarbonate plate was tested.

Ammonia gas was introduced in a glass desiccator equipped with a test piece (30×30 mm) and a gas detector tube. The desiccator was allowed to stand under indoor fluorescent light, and the concentration of the ammonia gas was measured with time. The results ware shown in Table 4.

The organic-inorganic hybrid material of the present invention had excellent ability of deodorizing for ammonia odor.

TABLE 4

Ability of Deodorizing Test for Ammonia Odor

| | Gas concentration (ppm) | | | |
|---|---|---|---|---|
| Test piece | Just introduced | After 1 hour | After 2 hour | After 5 hour |
| Example 1 | 500 | 40 | 10 | 5 or less |
| Example 2 | 490 | 30 | 10 | 5 or less |
| Example 3 | 500 | 50 | 30 | 10 |
| Example 4 | 500 | 50 | 20 | 10 |
| Example 5 | 490 | 30 | 10 | 5 or less |
| Example 6 | 500 | 40 | 10 | 5 or less |
| Example 7 | 490 | 40 | 20 | 10 |
| Example 8 | 500 | 50 | 30 | 20 |
| Example 9 | 500 | 40 | 20 | 5 or less |
| Example 10 | 500 | 30 | 10 | 5 or less |
| Example 11 | 500 | 50 | 30 | 10 |
| Example 12 | 490 | 50 | 30 | 10 |
| Polycarbonate | 500 | 480 | 470 | 430 |

Ability of Deodorizing Test for Methyl Mercaptan Odor

The ability of deodorizing for methyl mercaptan odor of the organic-inorganic hybrid materials prepared in Examples 1 to 12, and polycarbonate plate was tested.

Methyl mercaptan gas was introduced in a glass desiccator equipped with a test piece (30×30 mm) and a gas detector tube. The desiccator was allowed to stand under indoor fluorescent light, and the concentration of the methyl mercaptan gas was measured with time. The results ware shown in Table 5.

The organic-inorganic hybrid material of the present invention had excellent ability of deodorizing for methyl mercaptan odor.

TABLE 5

Ability of Deodorizing Test for Methyl Mercaptan Odor

| | Gas concentration (ppm) | | | |
|---|---|---|---|---|
| Test piece | Just introduced | After 1 hour | After 2 hour | After 5 hour |
| Example 1 | 200 | 50 | 20 | 10 |
| Example 2 | 200 | 40 | 10 | 5 |
| Example 3 | 200 | 60 | 30 | 20 |
| Example 4 | 200 | 60 | 30 | 20 |
| Example 5 | 200 | 40 | 20 | 5 |
| Example 6 | 190 | 40 | 10 | 5 |
| Example 7 | 190 | 50 | 30 | 10 |
| Example 8 | 190 | 60 | 30 | 20 |
| Example 9 | 200 | 40 | 10 | 5 |
| Example 10 | 200 | 50 | 20 | 10 |
| Example 11 | 190 | 50 | 20 | 10 |
| Example 12 | 200 | 50 | 30 | 20 |
| Polycarbonate | 200 | 180 | 170 | 150 |

Example 13

A mixed composition containing the PCS having a number average molecular weight of 4400 prepared in Preparation Example 1 and tetraethoxysilane (TEOS) in the ratio by weight shown in Table 6 was hydrolyzed in THF by using 1N aqueous hydrochloric acid at room temperature to obtain sample No. 1 to 4.

A mixed composition containing TEOS and titanium oxide particles for photo-catalysis available from Ishihara Techno K.K. as ST-21 (0.02 μm in average particle size, $TiO_2$) in the ratio by weight shown in Table 6 was hydrolyzed in THF by using 1N aqueous hydrochloric acid at room temperature to obtain sample No. 5 to 7.

TABLE 6

Composition of Samples

| No. | PCS/TEOS/$TiO_2$ (ratio) | PCS (g) | TEOS (g) | $TiO_2$ (g) | THF (ml) | 1N HCl aq. (mg) |
|---|---|---|---|---|---|---|
| 1 | 75/25/0 | 3.0 | 1.0 | 0 | 35 | 450 |
| 2 | 50/50/0 | 2.0 | 2.0 | 0 | 30 | 750 |
| 3 | 25/75/0 | 1.0 | 3.0 | 0 | 25 | 1100 |
| 4 | 0/100/0 | 0 | 4.0 | 0 | 20 | 1400 |
| 5 | 0/75/25 | 0 | 3.0 | 1.0 | 20 | 1050 |
| 6 | 0/50/50 | 0 | 2.0 | 2.0 | 20 | 750 |
| 7 | 0/25/75 | 0 | 1.0 | 3.0 | 20 | 400 |

The solutions and the dispersions of Table 6 were coated on a polycarbonate substrate by using a spin coater in the order of No. 1 to 7. When one solution was coated, the coated film was allowed to stand at room temperature for 1 minute, and the next solution was coated in conducting the coating steps. The coated substrate was then allowed to stand for 1 day, and heat treated at 100t for 10 hours (80 μm in film thickness).

Figure 3:
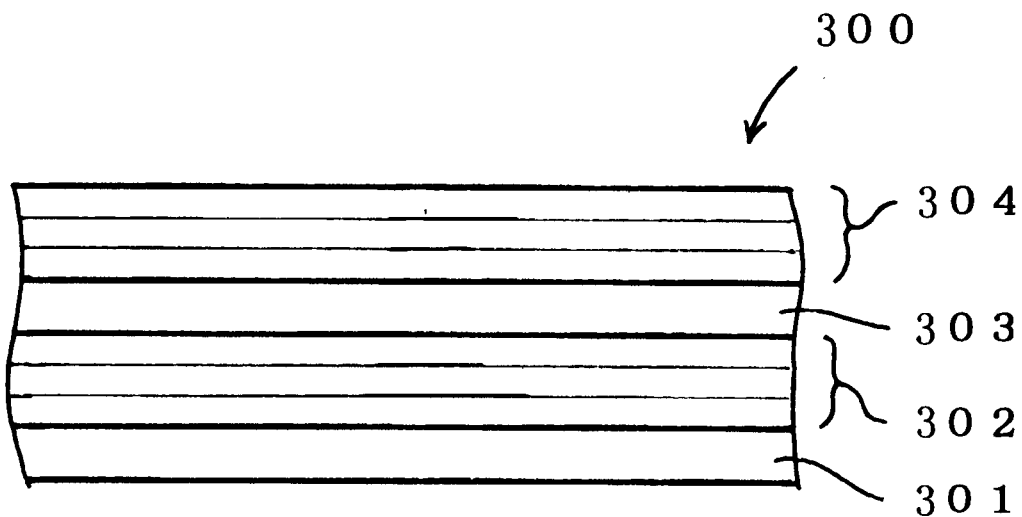
FIG. 3 is an illustrative sectional view which shows construction of the organic-inorganic hybrid material of Example 13 of the present invention.

As a result, the organic-inorganic hybrid material (300) as shown in FIG. 3 which has the polycarbonate substrate (301), the first intermediate layer (302) composed of component-gradient silica/crosslinked PCS, the second intermediate layer (303) composed of silica, and the photo-catalysis layer (304) composed of component-gradient silica/titanium oxide was obtained.

Example 14

The sample No. 1 to 4 of Table 6 were coated on a polycarbonate substrate by using a spin coater in the order of No. 1 to 4. When one solution was coated, the coated film was allowed to stand at room temperature for 1 minute, and the next solution was coated in conducting the coating steps.

4.0 g of titanium oxide particles for photo-catalysis available from Ishihara Techno K.K. as the trade name of ST-21 (0.02pm in average particle size, $TiO_2$) was dispersed in 20 ml of THF. The dispersion was coated on the surface of the coated layer by using a spin coater. The coated substrate was then allowed to stand for 1 day, and heat treated at 100° C. for 10 hours.

Figure 4:
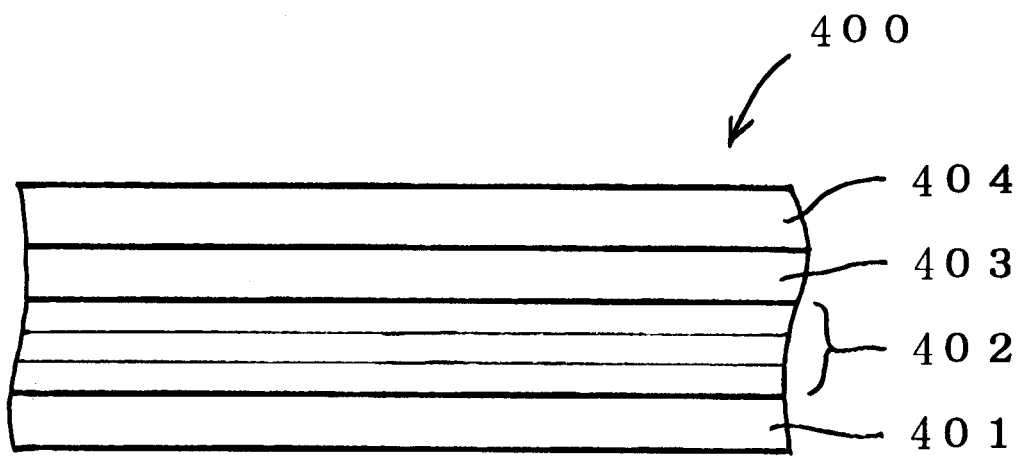
FIG. 4 is an illustrative sectional view which shows construction of the organic-inorganic hybrid material of Example 14 of the present invention.

As a result, the organic-inorganic hybrid material (400) as shown in FIG. 4 which has the polycarbonate substrate (401), the first intermediate layer (402) composed of component-gradient silica/crosslinked PCS, the second intermediate layer (403) composed of silica, and the photo-catalysis layer (404) composed of titanium oxide particles was obtained.

Example 15

A mixed composition containing the PSS having a number average molecular weight of 6000 prepared in Preparation Example 2 and tetramethoxysilane oligomer having a number average molecular weight of 1000 available from Mitsubishi Kagaku K.K. as MKC SILICATE MS-56 (TMOS) in the ratio by weight shown in Table 7 was hydrolyzed in THF by using 1N aqueous hydrochloric acid at room temperature to obtain sample No. 1 to 4.

A mixed composition containing TMOS and titanium oxide particles for photo-catalysis available from Ishihara Techno K.K. as ST-21 (0.02 μm in average particle size, $TiO_2$) in the ratio by weight shown in Table 7 was hydrolyzed in THF by using 1N aqueous hydrochloric acid at room temperature to obtain sample No. 5 to 7.

TABLE 7

Composition of Samples

| No. | PSS/TMOS/$TiO_2$ (ratio) | PSS (g) | TMOS (g) | $TiO_2$ (g) | THF (ml) | 1N HCl aq. (mg) |
|---|---|---|---|---|---|---|
| 1 | 75/25/0 | 3.0 | 1.0 | 0 | 35 | 450 |
| 2 | 50/50/0 | 2.0 | 2.0 | 0 | 30 | 800 |
| 3 | 25/75/0 | 1.0 | 3.0 | 0 | 25 | 1200 |
| 4 | 0/100/0 | 0 | 4.0 | 0 | 20 | 1500 |
| 5 | 0/75/25 | 0 | 3.0 | 1.0 | 20 | 1200 |
| 6 | 0/50/50 | 0 | 2.0 | 2.0 | 20 | 800 |
| 7 | 0/25/75 | 0 | 1.0 | 3.0 | 20 | 450 |

The solutions and the dispersions of Table 7 were coated on a polycarbonate substrate by using a spin coater in the order of No. 1 to 7. When one solution was coated, the coated film was allowed to stand at 50° C. for 10 minutes, and the next solution was coated in conducting the coating steps. The coated substrate was then allowed to stand for 1 day, and heat treated at 100t for 10 hours (90 μm in film thickness).

As a result, the organic-inorganic hybrid material which has the polycarbonate substrate, the first intermediate layer composed of component-gradient silica/crosslinked PSS, the second intermediate layer composed of silica, and the photo-catalysis layer composed of component-gradient silica/titanium oxide.

Example 16

A mixed composition containing the PAS having a number average molecular weight of 6700 prepared in Preparation Example 3 and TMOS in the ratio by weight shown in Table 8 was hydrolyzed in THF by using 1N aqueous hydrochloric acid at room temperature to obtain sample No. 1 to 4.

A mixed composition containing TMOS and titanium oxide particles for photo-catalysis available from Ishihara Techno K.K. as ST-21 (0.02 μm in average particle size, $TiO_2$) in the ratio by weight shown in Table 8 was hydrolyzed in THF by using 1N aqueous hydrochloric acid at room temperature to obtain sample No. 5.

TABLE 8

Composition of Samples

| No. | PAS/TMOS/$TiO_2$ (ratio) | PAS (g) | TMOS (g) | $TiO_2$ (g) | THF (ml) | 1N HCl aq. (mg) |
|---|---|---|---|---|---|---|
| 1 | 75/25/0 | 3.0 | 1.0 | 0 | 35 | 450 |
| 2 | 50/50/0 | 2.0 | 2.0 | 0 | 30 | 800 |
| 3 | 25/75/0 | 1.0 | 3.0 | 0 | 25 | 1200 |
| 4 | 0/100/0 | 0 | 4.0 | 0 | 20 | 1500 |
| 5 | 0/50/50 | 0 | 2.0 | 2.0 | 20 | 800 |

The solutions and the dispersion of Table 8 were coated on a polycarbonate substrate by using a spin coater in the order of No. 1 to 5. When one solution was coated, the coated film was allowed to stand at room temperature for 30 minutes, and the next solution was coated in conducting the coating steps. The coated substrate was then allowed to stand for 1 day, and heat treated at 100° C. for 10 hours.

As a result, the organic-inorganic hybrid material which has the polycarbonate substrate, the first intermediate layer composed of component-gradient silica/crosslinked PAS, the second intermediate layer composed of silica, and the photo-catalysis layer composed of silica/titanium oxide.

Example 17

The sample No. 1 to 4 of Table 8 were coated on a polycarbonate substrate by using a spin coater in the order of No. 1 to 4. When one solution was coated, the coated film was allowed to stand at room temperature for 30 minutes, and the next solution was coated in conducting the coating steps.

4.0 g of titanium oxide particles for photo-catalysis available from Ishihara Techno K.K. as the trade name of ST-21 (0.02 μm in average particle size, $TiO_2$) was dispersed in 20 ml of THF. The dispersion was coated on the surface of the coated layer by using a spin coater. The coated substrate was then allowed to stand for 1 day, and heat treated at 100° C. for 10 hours.

As a result, the organic-inorganic hybrid material which has the polycarbonate substrate, the first intermediate layer composed of component-gradient silica/crosslinked PAS, the second intermediate layer composed of silica, and the photo-catalysis layer composed of titanium oxide particles was obtained.

Example 18

The sample No. 1 to 4 of Table 6 were coated on a polycarbonate substrate by using a spin coater in the order of No. 1 to 4. When one solution was coated, the coated film was allowed to stand at room temperature for 1 minute, and the next solution was coated in conducting the coating steps.

2.0 g of TEOS, and 2.0 g of cuprous oxide were dispersed in 20 ml of THF, and hydrolyzed by using 800 mg -of 1N aqueous hydrochloric acid at room temperature. The dispersion was coated on the surface of the coated layer by using a spin coater. The coated substrate was then allowed to stand for 1 day, and heat treated at 100° C. for 10 hours.

As a result, the organic-inorganic hybrid material which has the polycarbonate substrate, the first intermediate layer composed of component-gradient silica/crosslinked PCS, the second intermediate layer composed of silica, and the photo-catalysis layer composed of silica/cuprous oxide was obtained.

Example 19

The sample No. 1 to 4 of Table 7 were coated on a polycarbonate substrate by using a spin coater in the order of No. 1 to 4. When one solution was coated, the coated film was allowed to stand at 50° C. for 10 minutes, and the next solution was coated in conducting the coating steps.

1.0 g of TMOS, and 3.0 g of cuprous oxide were dispersed in 20 ml of THF, and hydrolyzed by using 800 mg of 1N aqueous hydrochloric acid at room temperature. The dispersion was coated on the surface of the coated layer by using a spin coater. The coated substrate was then allowed to stand for 1 day, and heat treated at 100° C. for 10 hours.

As a result, the organic-inorganic hybrid material which has the polycarbonate substrate, the first intermediate layer composed of component-gradient silica/crosslinked PSS, the second intermediate layer composed of silica, and the photo-catalysis layer composed of silica/cuprous oxide was obtained.

Example 20

The sample No. 1 to 4 of Table 8 were coated on a polycarbonate substrate by using a spin coater in the order of No. 1 to 4. When one solution was coated, the coated film was allowed to stand at room temperature for 30 minutes, and the next solution was coated in conducting the coating steps.

4.0 g of cuprous oxide was dispersed in 20 ml of THF. The dispersion was coated on the surface of the coated layer by using a spin coater. The coated substrate was then allowed to stand for 1 day, and heat treated at 100° C. for 10 hours.

As a result, the organic-inorganic hybrid material which has the polycarbonate substrate, the first intermediate layer composed of component-gradient silica/crosslinked PAS, the second intermediate layer composed of silica, and the photo-catalysis layer composed of cuprous oxide particles was obtained.

Example 21

A mixed composition containing the PCS having a number average molecular weight of 4400 prepared in Preparation Example 1 and TEOS in the ratio by weight shown in Table 9 was hydrolyzed in THF by using 1N aqueous hydrochloric acid at room temperature to obtain sample No. 1 to 4.

A mixed composition containing TEOS and titanium butoxide (TBOT) in the ratio by weight shown in Table 9 was hydrolyzed in THF by using 1N aqueous hydrochloric acid at room temperature to obtain sample No. 5 to 8.

TABLE 9

Composition of Samples

| No. | PCS/TEOS/TBOT (ratio) | PCS (g) | TEOS (g) | TBOT (g) | THF (ml) | 1N HCl aq. (mg) |
|---|---|---|---|---|---|---|
| 1 | 75/25/0 | 3.0 | 1.0 | 0 | 35 | 450 |
| 2 | 50/50/0 | 2.0 | 2.0 | 0 | 30 | 750 |
| 3 | 25/75/0 | 1.0 | 3.0 | 0 | 25 | 1100 |
| 4 | 0/100/0 | 0 | 4.0 | 0 | 20 | 1400 |
| 5 | 0/75/25 | 0 | 3.0 | 1.0 | 20 | 1250 |
| 6 | 0/50/50 | 0 | 2.0 | 2.0 | 20 | 1100 |
| 7 | 0/25/75 | 0 | 1.0 | 3.0 | 20 | 950 |
| 8 | 0/0/100 | 0 | 0 | 4.0 | 20 | 850 |

The solutions of Table 9 were coated on a polycarbonate substrate by using a spin coater in the order of No. 1 to 8. When one solution was coated, the coated film was allowed to stand at room temperature for 1 minute, and the next solution was coated in conducting the coating steps. The coated substrate was then allowed to stand for 1 day, and heat treated at 100° C. for 10 hours.

As a result, the organic-inorganic hybrid material which has the polycarbonate substrate, the first intermediate layer composed of component-gradient silica/crosslinked PCS, the second intermediate layer composed of silica, and the photo-catalysis layer composed of component-gradient silica/titanium oxide was obtained.

Example 22

The sample No. 1 to 4, and 6 of Table 9 were coated on a polycarbonate substrate by using a spin coater in the order of No. 1 to 4, and 6. When one solution was coated, the coated film was allowed to stand at room temperature for 1 minute, and the next solution was coated in conducting the coating steps. The coated substrate was then allowed to stand for 1 day, and heat treated at 100° C. for 10 hours.

As a result, the organic-inorganic hybrid material which has the polycarbonate substrate, the first intermediate layer composed of component-gradient silica/crosslinked PCS, the second intermediate layer composed of silica, and the photo-catalysis layer composed of silica/titanium oxide was obtained.

Example 23

A mixed composition containing the PSS having a number average molecular weight of 6000 prepared in Preparation Example 2 and TMOS in the ratio by weight shown in Table 10 was hydrolyzed in THF by using 1N aqueous hydrochloric acid at room temperature to obtain sample No. 1 to 4.

A mixed composition containing TMOS and titanium butoxide tetramer (TBOTT) having a number average molecular weight of 970 in the ratio by weight shown in Table 10 was hydrolyzed in THF by using 1N aqueous hydrochloric acid at room temperature to obtain sample No. 5 to 8.

TABLE 10

Composition of Samples

| No. | PSS/TMOS/TBOTT (ratio) | PSS (g) | TMOS (g) | TBOTT (g) | THF (ml) | 1N HCl aq. (mg) |
|---|---|---|---|---|---|---|
| 1 | 75/25/0 | 3.0 | 1.0 | 0 | 35 | 450 |

TABLE 10-continued

Composition of Samples

| No. | PSS/TMOS/TBOTT (ratio) | PSS (g) | TMOS (g) | TBOTT (g) | THF (ml) | 1N HCl aq. (mg) |
|---|---|---|---|---|---|---|
| 2 | 50/50/0 | 2.0 | 2.0 | 0 | 30 | 800 |
| 3 | 25/75/0 | 1.0 | 3.0 | 0 | 25 | 1200 |
| 4 | 0/100/0 | 0 | 4.0 | 0 | 20 | 1450 |
| 5 | 0/75/25 | 0 | 3.0 | 1.0 | 20 | 1250 |
| 6 | 0/50/50 | 0 | 2.0 | 2.0 | 20 | 1100 |
| 7 | 0/25/75 | 0 | 1.0 | 3.0 | 20 | 900 |
| 8 | 0/0/100 | 0 | 0 | 4.0 | 20 | 750 |

The solutions of Table 10 were coated on a polycarbonate substrate by using a spin coater in the order of No. 1 to 8. When one solution was coated, the coated film was allowed to stand at 50° C. for 10 minutes, and the next solution was coated in conducting the coating steps. The coated substrate was then allowed to stand for 1 day, and heat treated at 100° C. for 10 hours.

As a result, the organic-inorganic hybrid material which has the polycarbonate substrate, the first intermediate layer composed of component-gradient silica/crosslinked PSS, the second intermediate layer composed of silica, and the photo-catalysis layer composed of component-gradient silica/titanium oxide was obtained.

Example 24

The sample No. 1 to 4, and 7 of Table 10 were coated on a polycarbonate substrate by using a spin coater in the order of No. 1 to 4, and 7. When one solution was coated, the coated film was allowed to stand at 50° C. for 10 minutes, and the next solution was coated in conducting the coating steps. The coated substrate was then allowed to stand for 1 day, and heat treated at 100° C. for 10 hours.

As a result, the organic-inorganic hybrid material which has the polycarbonate substrate, the first intermediate layer composed of component-gradient silica/crosslinked PSS, the second intermediate layer composed of silica, and the photo-catalysis layer composed of silica/titanium oxide was obtained.

Example 25

A mixed composition containing the PAS having a number average molecular weight of 6700 prepared in Preparation Example 3 and TMOS in the ratio by weight shown in Table 11 was hydrolyzed in THF by using 1N aqueous hydrochloric acid at room temperature to obtain sample No. 1 to 4.

A mixed composition containing TMOS and titanium tetraisopropoxide (TIPOT) in the ratio by weight shown in Table 11 was hydrolyzed in THF by using 1N aqueous hydrochloric acid at room temperature to obtain sample No. 5 to 8.

TABLE 11

Composition of Samples

| No. | PAS/TMOS/TIPOT (ratio) | PAS (g) | TMOS (g) | TIPOT (g) | THF (ml) | 1N HCl aq. (mg) |
|---|---|---|---|---|---|---|
| 1 | 75/25/0 | 3.0 | 1.0 | 0 | 35 | 450 |
| 2 | 50/50/0 | 2.0 | 2.0 | 0 | 30 | 800 |
| 3 | 25/75/0 | 1.0 | 3.0 | 0 | 25 | 1200 |
| 4 | 0/100/0 | 0 | 4.0 | 0 | 20 | 1450 |
| 5 | 0/75/25 | 0 | 3.0 | 1.0 | 20 | 1300 |
| 6 | 0/50/50 | 0 | 2.0 | 2.0 | 20 | 1200 |
| 7 | 0/25/75 | 0 | 1.0 | 3.0 | 20 | 1100 |
| 8 | 0/0/100 | 0 | 0 | 4.0 | 20 | 1000 |

The solutions of Table 11 were coated on a polycarbonate substrate by using a spin coater in the order of No. 1 to 8. When one solution was coated, the coated film was allowed to stand at room temperature for 30 minutes, and the next solution was coated in conducting the coating steps. The coated substrate was then allowed to stand for 1 day, and heat treated at 100° C. for 10 hours.

As a result, the organic-inorganic hybrid material which has the polycarbonate substrate, the first intermediate layer composed of component-gradient silica/crosslinked PAS, the second intermediate layer composed of silica, and the photo-catalysis layer composed of component-gradient silica/titanium oxide was obtained.

Example 26

The sample No. 1 to 4, and 8 of Table 11 were coated on a polycarbonate substrate by using a spin coater in the order of No. 1 to 4, and 8. When one solution was coated, the coated film was allowed to stand at room temperature for 30 minutes, and the next solution was coated in conducting the coating steps. The coated substrate was then allowed to stand for 1 day, and heat treated at 100° C. for 10 hours.

As a result, the organic-inorganic hybrid material which has the polycarbonate substrate, the first intermediate layer composed of component-gradient silica/crosslinked PAS, the second intermediate layer composed of silica, and the photo-catalysis layer composed of titanium oxide was obtained.

Example 27

The sample No. 1 to 4 of Table 9 were coated on a polycarbonate substrate by using a spin coater in the order of No. 1 to 4. When one solution was coated, the coated film was allowed to stand at room temperature for 1 minute, and the next solution was coated in conducting the coating steps. Titanium oxide particles for photo-catalysis available from Ishihara Techno K.K. as the trade name of ST-21 (0.02 $\mu$m in average particle size, $TiO_2$) were applied through a wire mesh filter having 3500 mesh (reference size of the particle path through the mesh is 4 $\mu$m) available from Manabe Kogyo K.K. The coated substrate was then allowed to stand for 1 day, and heat treated at 100° C. for 10 hours.

As a result, the organic-inorganic hybrid material which has the polycarbonate substrate, the first intermediate layer composed of component-gradient silica/crosslinked PCS, the second intermediate layer composed of silica, and the photo-catalysis layer composed of titanium oxide particles was obtained.

Comparative Example 6

2.0 g of TEOS, and 2.0 g of anatase type titanium oxide having an average particle size of 5 $\mu$m were dispersed in 20 ml of THF, and hydrolyzed by using 750 mg of 1N aqueous hydrochloric acid at room temperature to Ad prepare a dispersion. The dispersion was coated on the surface of the polycarbonate substrate to form the photo-catalysis layer.

The coated material was allowed to stand at room temperature for 1 day, and heated at 100° C. for 10 hours.

Comparative Example 7

2.0 g of TMOS, and 2.0 g of cuprous oxide were dispersed in 20 ml of THF, and hydrolyzed by using 800 mg of 1N aqueous hydrochloric acid at room temperature to prepare a dispersion. The dispersion was coated on the surface of the polycarbonate substrate to form the photo-catalysis layer.

The coated material was allowed to stand at room temperature for 1 day, and heated at 100° C. for 10 hours.

Comparative Example 8

4.0 g of titanium tetrabutoxide was dissolved in 20 ml of THF, and hydrolyzed by using 850 mg of 1N aqueous hydrochloric acid at room temperature to prepare a solution. The solution was coated on the surface of the polycarbonate substrate to form the photo-catalysis layer.

The coated material was allowed to stand at room temperature for 1 day, and heated at 100° C. for 10 hours.

Comparative Example 9

2.0 g of the PCS having a number average molecular weight of 4400 prepared in Preparation Example 1, and 2.0 g of anatase type titanium oxide having an average particle size of 5 µm were dissolved in 30 ml of THF, and hydrolyzed by using 50 mg of 1N aqueous hydrochloric acid at room temperature to prepare a dispersion. The dispersion was coated on the surface of the polycarbonate substrate to form the photo-catalysis layer.

The coated material was allowed to stand at room temperature for 1 day, and heated at 100° C. for 10 hours.

Comparative Example 10

2.0 g of the PCS having a number average molecular weight of 4400 prepared in Preparation Example 1, and 2.0 g of cuprous oxide particles were dissolved in 30 ml of THF, and hydrolyzed by using 50 mg of 1N aqueous hydrochloric acid at room temperature to prepare a dispersion. The dispersion was coated on the surface of the polycarbonate substrate to form the photo-catalysis layer.

The coated material was allowed to stand at room temperature for 1 day, and heated at 100° C. for 10 hours.

Heat Shock Test

Heat shock resistance of the organic-inorganic hybrid materials prepared in Examples 13 to 26, and Comparative Examples 6 to 8 was tested.

A test piece (30×30 mm) was heated in a drying oven at 120° C. for 30 minutes, and immediately cooled in a freezer at −20° C. for 30 minutes. This cycle was repeated three times. Thereafter, the test piece was visually observed.

Cracks were formed in the coated layer, and the coated layer was detached from the substrate on the test pieces of Comparative Examples 6 to 8, and no change was observed on the test pieces of Examples 13 to 26. The results were shown in Table 12.

The organic-inorganic hybrid material of the present invention had excellent heat shock resistance.

TABLE 12

Heat Shock Test

| Test Piece | Substrate appearance | Test Piece | Substrate appearance |
|---|---|---|---|
| Example 13 | o | Example 22 | o |
| Example 14 | o | Example 23 | o |
| Example 15 | o | Example 24 | o |
| Example 16 | o | Example 25 | o |
| Example 17 | o | Example 26 | o |
| Example 18 | o | C. Ex. 6 | x |
| Example 19 | o | C. Ex. 7 | x |
| Example 20 | o | C. Ex. 8 | x |
| Example 21 | o | | | o: No change was observed.
x: Cracks and peeling of the coated layer were occured.

Cross Cut Tape Test

Adhesiveness of the coated layer of the organic-inorganic hybrid materials prepared in Examples 13 to 26, and Comparative Examples 6 to 8 were tested according to the same manner as that described in Examples 1 to 12. The results were shown in Table 13.

Nearly all the squares of the coated layer were detached on the test pieces of Comparative Examples 6 to 8. Whereas, no square of the coated layer was detached on the test pieces of Examples 13 to 26. The results show that the organic-inorganic hybrid material of the present invention has excellent interface strength.

TABLE 13

Cross Cut Tape Test

| Test Piece | Unpeeled Squares | Test Piece | Unpeeled Squares |
|---|---|---|---|
| Example 13 | 100/100 (100/100) | Example 22 | 100/100 (100/100) |
| Example 14 | 100/100 (100/100) | Example 23 | 100/100 (100/100) |
| Example 15 | 100/100 (100/100) | Example 24 | 100/100 (100/100) |
| Example 16 | 100/100 (100/100) | Example 25 | 100/100 (100/100) |
| Example 17 | 100/100 (100/100) | Example 26 | 100/100 (100/100) |
| Example 18 | 100/100 (100/100) | C. Ex. 6 | 10/100 (−) |
| Example 19 | 100/100 (100/100) | C. Ex. 7 | 3/100 (−) |
| Example 20 | 100/100 (100/100) | C. Ex. 8 | 5/100 (−) |
| Example 21 | 100/100 (100/100) | | |

The data in parenthesis are the results after heat shock test

Accelerating Weathering Test

Weather resistance of the organic-inorganic hybrid materials prepared in Examples 13 to 26, and Comparative Examples 9 and 10 were tested according to the same manner as that described in Examples 1 to 12. The results were shown in Table 14.

Discoloration of the substrate was observed on the test pieces of Comparative Examples 9 and 10, and no change was observed on the test pieces of Examples 13 to 26.

It is thought that the substrate of the test piece of Comparative Example is oxidized and discolored because the substrate directly contacts with titanium oxide or cuprous oxide. Whereas, the substrate of the test piece of Example is not oxidized because the substrate and the titanium oxide or the cuprous oxide, are separated by the silica layer.

TABLE 14

Accelerating Weathering Test

| Test Piece | Substrate appearance | Test Piece | Substrate appearance |
|---|---|---|---|
| Example 13 | o | Example 21 | o |
| Example 14 | o | Example 22 | o |
| Example 15 | o | Example 23 | o |
| Example 16 | o | Example 24 | o |
| Example 17 | o | Example 25 | o |
| Example 18 | o | Example 26 | o |
| Example 19 | o | C. Ex. 9 | x |
| Example 20 | o | C. Ex. 10 | x | o: No change was observed.
x: Change such as discoloration was observed.

Ability of Deodorizing Test for Tobacco Odor

The ability of deodorizing for tobacco odor of the organic-inorganic hybrid materials prepared in Examples 13 to 27, and polycarbonate plate was tested according to the same manner as that described in Examples 1 to 12. The results were shown in Table 15.

Tobacco odor was found in the bottle of the polycarbonate plate, but no odor was found in the bottles of the test pieces of Examples 13 to 27.

The organic-inorganic hybrid material of the present invention had excellent ability of deodorizing for tobacco odor.

TABLE 15

Ability of Deodorizing Test for Tobacco Odor

| Test Piece | Odor | Test Piece | Odor |
|---|---|---|---|
| Example 13 | o | Example 21 | o |
| Example 14 | o | Example 22 | o |
| Example 15 | o | Example 23 | o |
| Example 16 | o | Example 24 | o |
| Example 17 | o | Example 25 | o |
| Example 18 | o | Example 26 | o |
| Example 19 | o | Example 27 | o |
| Example 20 | o | Polycarbonate | x | o: No or little odor remained.
x: Strong odor remained.

Ability of Deodorizing Test for Ammonia Odor

The ability of deodorizing for ammonia odor of the organic-inorganic hybrid/materials prepared in Examples 13 to 27, and polycarbonate plate was tested according to the same manner as that described in Examples 1 to 12. The results were shown in Table 16.

The organic-inorganic hybrid material of the present invention had excellent ability of deodorizing for ammonia odor.

TABLE 16

Ability of Deodorizing Test for Ammonia Odor

| | Gas concentration (ppm) | | | |
|---|---|---|---|---|
| Test Piece | Just introduced | After 1 hour | After 2 hour | After 5 hour |
| Example 13 | 490 | 50 | 20 | 10 |
| Example 14 | 490 | 30 | 10 | 5 or less |
| Example 15 | 500 | 50 | 20 | 10 |
| Example 16 | 480 | 50 | 20 | 10 |
| Example 17 | 490 | 20 | 10 | 5 or less |
| Example 18 | 490 | 50 | 30 | 10 |
| Example 19 | 500 | 40 | 20 | 10 |
| Example 20 | 500 | 30 | 20 | 10 |
| Example 21 | 500 | 30 | 10 | 5 or less |
| Example 22 | 490 | 40 | 30 | 10 |
| Example 23 | 490 | 20 | 10 | 5 or less |
| Example 24 | 500 | 40 | 20 | 5 or less |
| Example 25 | 500 | 30 | 20 | 5 or less |
| Example 26 | 500 | 30 | 10 | 5 or less |
| Example 27 | 490 | 30 | 10 | 5 or less |
| Polycarbonate | 500 | 480 | 470 | 430 |

Ability of Deodorizing Test for Methyl Mercaptan Odor

The ability of deodorizing for methyl mercaptan odor of the organic-inorganic hybrid materials prepared in Examples 13 to 27, and polycarbonate plate was tested according to the same manner as that described in Examples 1 to 12. The results were shown in Table 17.

The organic-inorganic hybrid material of the present invention had excellent ability of deodorizing for methyl mercaptan odor.

TABLE 17

Ability of Deodorizing Test for Methyl Mercaptan Odor

| | Gas concentration (ppm) | | | |
|---|---|---|---|---|
| Test Piece | Just introduced | After 1 hour | After 2 hour | After 5 hour |
| Example 13 | 200 | 60 | 30 | 10 |
| Example 14 | 200 | 50 | 20 | 5 |
| Example 15 | 190 | 60 | 30 | 20 |
| Example 16 | 200 | 60 | 30 | 20 |
| Example 17 | 190 | 40 | 20 | 5 |
| Example 18 | 200 | 60 | 30 | 20 |
| Example 19 | 200 | 50 | 20 | 10 |
| Example 20 | 190 | 50 | 20 | 10 |
| Example 21 | 190 | 40 | 10 | 5 |
| Example 22 | 200 | 50 | 30 | 10 |
| Example 23 | 200 | 50 | 10 | 5 |
| Example 24 | 190 | 50 | 30 | 20 |
| Example 25 | 200 | 40 | 20 | 5 |
| Example 26 | 200 | 50 | 20 | 10 |
| Example 27 | 200 | 40 | 10 | 5 |
| Poycarbonate | 200 | 180 | 170 | 150 |

What is claimed is:
1. An organic-inorganic hybrid material comprising a substrate, an intermediate layer and a photo-catalysis layer which are sequentially formed on a surface of the substrate wherein:
the intermediate layer is composed of an organic-inorganic hybrid polymer material in which an organic polymer component and a metal oxide component are covalently bonded to each other, which is obtained by hydrolyzing and polycondensing a solution or a wet gel which comprises an organic polymer having an alkoxymetal group as a functional group or an organic polymer having a functional group reactable with a metal alkoxide compound, and a metal alkoxide compound, and
the photo-catalysis layer is composed of metal oxides having photo-catalysis.

2. The organic-inorganic hybrid material according to claim 1, wherein a main frame of the organic polymer is a thermosetting resin.

3. The organic-inorganic hybrid material according to claim 1, wherein a main frame of the organic polymer is a thermoplastic resin.

4. The organic-inorganic hybrid material according to claim 1, wherein a main frame of the organic polymer is polycarbonate, polyarylate, or polysulfone.

5. The organic-inorganic hybrid material according to claim 1, wherein the organic polymer has at least one functional group selected from the group consisting of an alkoxymetal group, a hydroxyl group, an amino group, and a carboxyl group.

6. The organic-inorganic hybrid material according to claim 1, wherein the organic polymer has at least one metal alkoxide group as a functional group.

7. The organic-inorganic hybrid material according to claim 1, wherein the metal oxide of the intermediate layer does not have photo-catalysis.

8. The organic-inorganic hybrid material according to claim 1, wherein the metal oxide of the intermediate layer does not have photo-catalysis, and is prepared by hydrolyzing and polycondensing a metal alkoxide compound or a metal alkoxide mixture comprising the same.

9. The organic-inorganic hybrid material according to claim 1, wherein metal element of the metal oxide of the intermediate layer is at least one selected from the group consisting of Si and Zr.

10. The organic-inorganic hybrid material according to claim 1, wherein the metal oxide of the intermediate layer is prepared by hydrolyzing and polycondensing silicon alkoxide, zirconium alkoxide, or a metal alkoxide mixture comprising either thereof.

11. The organic-inorganic hybrid material according to claim 1, wherein metal element of the metal oxide of the intermediate layer is Si.

12. The organic-inorganic hybrid material according to claim 1, wherein the metal oxide of the intermediate layer is prepared by hydrolyzing and polycondensing silicon alkoxide, or a metal alkoxide mixture comprising the silicon alkoxide.

13. The organic-inorganic hybrid material according to claim 1, wherein the photo-catalysis layer comprises 10 to 100% by weight of metal oxide having photo-catalysis.

14. The organic-inorganic hybrid material according to claim 1, wherein the metal oxide having photo-catalysis is selected from the group consisting of titanium oxide and cuprous oxide.

15. The organic-inorganic hybrid material according to claim 1, wherein the photo-catalysis layer is composed of a material which comprises metal oxide particles having photo-catalysis.

16. The organic-inorganic hybrid material according to claim 1, wherein the photo-catalysis layer is composed of metal oxide having photo-catalysis, and is prepared by hydrolyzing and polycondensing a metal alkoxide compound or a metal alkoxide mixture comprising the same.

17. The organic-inorganic hybrid material according to claim 1, wherein the substrate is an organic material.

18. The organic-inorganic hybrid material according to claim 1, wherein the photo-catalysis means deodorizing, bleaching, antifouling, anti-bacterial, or sanitizing.

19. An organic-inorganic hybrid material comprising a substrate, the first intermediate layer, the second intermediate layer, and a photo-catalysis layer which are sequentially formed on a surface of the substrate wherein:

the first intermediate layer is composed of an organic-inorganic hybrid polymer material in which an organic polymer component and a metal oxide component are covalently bonded to each other, which is obtained by hydrolyzing and polycondensing a solution or a wet gel which comprises an organic polymer having an alkoxymetal group as a functional group or an organic polymer having a functional group reactable with a metal alkoxide compound, and a metal alkoxide compound, the second intermediate layer is composed of metal oxide which is obtained by hydrolyzing and polycondensing a metal alkoxide compound, and the photo-catalysis layer is composed of metal oxides having photo-catalysis.

20. An organic-inorganic hybrid material comprising a substrate, an intermediate layer and a photo-catalysis layer which are sequentially formed on a surface of the substrate wherein:

the intermediate layer is composed of an organic-inorganic hybrid component-gradient polymer material in which an organic polymer component and a metal oxide component are covalently bonded to each other, and content of the metal oxide component is increased from the substrate in the direction of the photo-catalysis layer, and the photo-catalysis layer is composed of metal oxides having photo-catalysis.

21. An organic-inorganic hybrid material comprising a substrate, the first intermediate layer, the second intermediate layer, and a photo-catalysis layer which are sequentially formed on a surface of the substrate wherein:

the first intermediate layer is composed of an organic-inorganic hybrid component-gradient polymer material in which an organic polymer component and a metal oxide component are covalently bonded to each other, and content of the metal oxide component is increased from the substrate in the direction of the second intermediate layer, the second intermediate layer is composed of metal oxide which is obtained by hydrolyzing and polycondensing a metal alkoxide compound, and the photo-catalysis layer is composed of metal oxides having photo-catalysis.

22. A process for preparing an organic-inorganic hybrid material comprising the steps of:

(i) providing a substrate having a surface;

(ii) applying a solution or a wet gel which comprises an organic polymer having an alkoxymetal group as a functional group or an organic polymer having a functional group reactable with a metal alkoxide compound, and a metal alkoxide compound on the surface of the substrate to form an intermediate layer;

(iii) forming a photo-catalysis layer which is composed of a material comprising metal oxide having photo-catalysis on the surface of the intermediate layer.

23. The process according to claim 22, wherein the photo-catalysis layer is formed by directly applying a material which comprises particles of metal oxide having photo-catalysis on the surface of the intermediate layer.

24. The process according to claim 22, wherein the photo-catalysis layer is formed by the steps of: dispersing metal oxide particles having photo-catalysis into a volatile solvent, and applying the resulting dispersion on the surface of the intermediate layer.

25. The process according to claim 22, wherein the photo-catalysis layer is formed by applying thereon a solution or a wet gel which comprises a metal alkoxide compound having photo-catalysis or a low condensate of the metal alkoxide on the surface of the intermediate layer.

26. A process for preparing an organic-inorganic hybrid material comprising the steps of:
   (i) providing a substrate having a surface;
   (ii) applying a solution or a wet gel which comprises an organic polymer having an alkoxymetal group as a functional group or an organic polymer having a functional group reactable with a metal alkoxide compound, and a metal alkoxide compound on the surface of the substrate to form the first intermediate layer;
   (iii) applying a solution or a wet gel which comprises a metal alkoxide compound on the surface of the first intermediate layer to form the second intermediate layer;
   (iv) forming a photo-catalysis layer which is composed of a material comprising metal oxide having photo-catalysis on the surface of the second intermediate layer.

27. A process for preparing an organic-inorganic hybrid material comprising the steps of:
   (i) providing a substrate having a surface;
   (ii) applying a solution or a wet gel which comprises an organic polymer having an alkoxymetal group as a functional group or an organic polymer having a functional group reactable with a metal alkoxide compound, and a metal alkoxide compound on the surface of the substrate to form a coated layer;
   (iii) altering a compositional ratio of the solution or the wet gel so that content of the metal oxide component is increased, and applying it thereon;
   (iv) repeating step (iii) at least one time to form the intermediate layer;
   (v) forming a photo-catalysis layer which is composed of a material comprising metal oxide having photo-catalysis on the surface of the intermediate layer.

28. A process for preparing an organic-inorganic hybrid material comprising the steps of:
   (i) providing a substrate having a surface;
   (ii) applying a solution or a wet gel which comprises an organic polymer having an alkoxymetal group as a functional group or an organic polymer having a functional group reactable with a metal alkoxide compound, and a metal alkoxide compound on the surface of the substrate to form a coated layer;
   (iii) altering a compositional ratio of the solution or the wet gel so that content of the metal oxide component is increased, and applying it thereon;
   (iv) repeating step (iii) at least one time to form the first intermediate layer;
   (v) applying a solution or a wet gel which comprises a metal alkoxide compound on the surface of the first intermediate layer to form the second intermediate layer;
   (vi) forming a photo-catalysis layer which is composed of a material comprising metal oxide having photo-catalysis on the surface of the intermediate layer.

* * * * *

UNITED STATES PATENT AND TRADEMARK OFFICE
CERTIFICATE OF CORRECTION

PATENT NO. : 6,228,796 B1
DATED : May 8, 2001
INVENTOR(S) : Motoomi Arakawa et al.

It is certified that error appears in the above-identified patent and that said Letters Patent is hereby corrected as shown below:

<u>Title page,</u>
Item [73] Assignee, please make the following corrections:

Assignees: Orient Chemical Industries, Ltd., Osaka-fu (JP)<u>; and Osaka Municipal Government, Osaka-fu (JP).</u> --

Signed and Sealed this

Eighteenth Day of September, 2001

Attest:

*Nicholas P. Godici*

NICHOLAS P. GODICI
*Attesting Officer*     *Acting Director of the United States Patent and Trademark Office*